United States Patent [19]

Hakvoort

[11] Patent Number: 5,724,887
[45] Date of Patent: Mar. 10, 1998

[54] FRYING DEVICE

[75] Inventor: Jan Hakvoort, Urk, Netherlands

[73] Assignee: Hakvoort Horeca B.V., Netherlands

[21] Appl. No.: 776,365

[22] PCT Filed: Aug. 1, 1995

[86] PCT No.: PCT/NL95/00264

§ 371 Date: Jan. 27, 1997

§ 102(e) Date: Jan. 27, 1997

[87] PCT Pub. No.: WO96/03910

PCT Pub. Date: Feb. 15, 1996

[30] Foreign Application Priority Data

Aug. 1, 1994 [NL] Netherlands ............... 9401261

[51] Int. Cl.⁶ .................................................. A47J 37/12
[52] U.S. Cl. .................. 99/403; 99/330; 99/408; 126/387; 126/391
[58] Field of Search ............... 99/403, 408, 407, 99/410, 330; 126/391, 39 R, 350 R, 387, 92 AC, 373; 426/417; 431/329; 210/167, DIG. 8

[56] References Cited

U.S. PATENT DOCUMENTS

| | | | |
|---|---|---|---|
| 1,994,555 | 3/1935 | Wilson | 99/408 |
| 3,990,433 | 11/1976 | Keating | 126/391 |
| 4,603,622 | 8/1986 | Beck | 99/403 |
| 4,947,824 | 8/1990 | Ejiri et al. | 126/391 |
| 5,184,539 | 2/1993 | Oiwa | 99/408 |
| 5,253,566 | 10/1993 | McCabe et al. | 99/330 X |
| 5,282,458 | 2/1994 | Trimble | 126/373 X |
| 5,417,202 | 5/1995 | Cote | 99/330 X |
| 5,486,370 | 1/1996 | Bivens | 426/417 |
| 5,597,601 | 1/1997 | Griffin | 99/403 X |
| 5,609,093 | 3/1997 | Hohler et al. | 99/408 |
| 5,617,776 | 4/1997 | King et al. | 99/403 X |
| 5,632,197 | 5/1997 | Lubawy et al. | 99/403 |

FOREIGN PATENT DOCUMENTS

| | | |
|---|---|---|
| 2570942 | 4/1986 | France . |
| 807354 | 1/1959 | United Kingdom . |

*Primary Examiner*—Timothy F. Simone
*Attorney, Agent, or Firm*—Brooks & Kushman P.C.

[57] ABSTRACT

Frying device (1), comprising a frying tank (2) which can be filled with a frying medium. The frying tank consists of an upper part (18) and a shaft (20) which extends downwards and is open at the top. The bottom (19) of the upper part is connected by a number of pipes (26) to the side wall of the shaft so that the frying medium in the shaft is in open communication to the frying medium in the upper part. The pipes are enclosed by a tint heating chamber (27) with an inlet and an outlet (33) for heating gases. The first heating chamber is bounded by the bottom of the upper part and by the front wall of the shaft. The outlet (33) of the first heating chamber runs through the shaft to a second heating chamber (34), one of the walls of the second heating chamber being the rear wall (22) of the shaft.

5 Claims, 5 Drawing Sheets

FRYING DEVICE

The invention relates to a frying device, comprising a frying tank with a drain cock and heating means for heating the frying medium, which frying tank consists of an upper and a lower part, which upper part has side walls and an upper part bottom, and in which upper part bottom a bottom tank or shaft extends downwards and has side walls and a lower part bottom, and which frying tank can be filled with a frying medium such as fat or oil for deep-frying, and of which the side wall of the shaft is in open connection with the upper part the frying tank by way of a number of pipes which pipes are placed at an angle to the horizontal, so that by means of the pipes the frying medium in the shaft is in open communication to the frying medium in the rest of the frying tank, and which drain cock is provided in the bottom of the frying tank, in order to be able of emptying the frying tank.

Such a device is known from the U.S. Pat. No. 5,184,539. The device which is disclosed in this patent, comprises an oil tank having in its bottom a bottom inner tank and a bottom outer tank which outer tank or shaft is connected to the lower portion of the inner tank via four small connection tubes or pipes. The heating means of this known device comprises a burner which is located directly under the bottom of the inner tank. The bottom wall of the inner tank is heated by the flame of the burner as well as circular combustion cylinders which radiate the heat. As a result the bottom wall of the inner tank will be locally extremely hot which will cause that the deep-frying fat will be broken down within a relatively short time. Also the heat exchange surface is rather small. The pipes which interconnect the inner tank with the outer tank are small and just only four as the circulation between the outer tank and the bottom inner tank needed to be small so to give the scum the time to be collected into the scum filter and the filtering material near the bottom of the outer tank. The pipes are also needed as the liquid in the inner tank needs to be in communication with the liquid in the outer tank as to be able to empty the inner tank through the drain cock. Because of the small diameter of the pipes, the circulation of the frying medium is limited.

The object of the invention is to provide a frying device with improved performance and having an efficient heat transfer from the heating means to the frying medium, so that exchange from the heating medium towards the frying medium will be much more efficient than until now was possible.

This object is achieved by the invention with a frying device of the type mentioned in the preamble, in which a side wall of the shaft or a bottom tank contains a large number of openings and the bottom of the upper part contains the same number of openings and that by means of a tube each opening in the side wall of the shaft is interconnected to a opening in the bottom of the upper part and that the tubes are directly heated by the heating means.

The frying device consequently acquires an extra-large heat-exchanging surface, combined with a compact shape. In comparison with the inner bottom tank of the frying device of U.S. Pat. No. 5,184,538, the heating exchange surface in comparison to the volume according to the new design of this invention has been greatly enlarged. Also much less frying medium is needed for a device according to the invention as the oil is heated very quickly and the heated volume of the oil is much less than until now required. The enlarged heating surface makes efficient heat transfer possible, with the result that a high performance is achieved.

Due to the fact that the pipes are heated in their entirety by the heating medium and at the same time the frying tank and the shaft are heated only on some walls or the bottom, the frying medium will circulate and rise up from the shaft through the pipes to the upper part of the frying tank. The frying medium situated in the upper part consequently flows to the shaft. This circulation flow means that the frying medium is heated quickly and uniformly. Any frying residues present are discharged in this way to the bottom of the shaft, where an outlet can be provided. Due to the fact that the heat transfer surface has been increased considerably, the surface temperatures of the heat exchanger are considerably lower than is the case with known frying devices. It has been found that deep-frying fat is broken down much less quickly as a result, and lasts considerably longer.

The pipes are preferably enclosed by a first heating chamber with an inlet and an outlet for heating gases, such that the heating medium will flow around the tubes or pipes. The heating gases, for example the combustion gases of a gas burner, can flow freely along the pipes and constantly supply new heat to a very large surface.

The first heating chamber is preferably bounded by the bottom of the upper part of the frying tank and the front wall of the shaft such that they are part of the enclosure of the first heating chamber. This produces a compact frying device, in which efficient heat circulation is possible.

The outlet of the first heating chamber preferably runs through the shaft of the frying tank to a second heating chamber with an inlet and an outlet, one of the walls of the second heating chamber being the rear wall of the shaft, and the outlet of the first heating chamber being the inlet of the second heating chamber. In the case of this construction the residual heat from the combustion gases discharged from the first heating chamber is utilized in the optimum manner, so that the performance of the frying device is increased further.

The means for heating the frying medium are preferably a modulating burner. Such burners are known per se from central heating systems. When the modulating burner has almost reached a set temperature, the burner already begins to burn lower. This means that the burner will go much less above the set temperature. If, for example, the modulating burner has been set at 180 degrees, the burner will already start to burn lower when it reaches 176 degrees. A conventional burner, on the other hand, will not stop until it has reached the set temperature, with the result that the temperature increase often runs up to 185 degrees or more. This additional heat means a rise in energy costs, and the deep-frying fat breaks down more quickly. The means for heating the frying medium are preferably equipped with a glow plug. Compared with a conventional igniter, this has the advantage that less electricity is needed to ignite the gas of the burner. This makes the frying device according to the invention even more economical in use.

In the case of frying devices the temperature of the frying medium generally lies around 180 degrees Celsius. It follows from this that when a gas burner is used as the heating element the combustion gases can cool down no further than this temperature. On the basis of this premise, it emerges from calculations that the waterboil efficiency of a frying device can be maximum 83.6% at the upper value in the absence of heat losses. It has been found that the waterboil efficiency of the frying device according to the invention lies at around 80.6% at the upper value and 89.4% at the lower value. The heat transfer is found to be very efficient, with little heat loss. Compared with the conventional frying devices, the invention provides a greatly improved frying device as regards performance. The idle time losses are also very low. A high performance also means efficient use of gas and the minimum of heat released to the environment. In hot countries in particular, this can mean a saving on air-conditioning costs. Moreover, a higher performance also means that more chips or other deep-fried products can be processed per unit time.

A frying device according to the invention can be designed in many ways, for example as a deep-fat frier or as a high-pressure deep-fat frier with sealed frying tank. The frying tank can be, for example rectangular or round.

The invention will be explained in greater detail below with reference to drawings, in which.

Figure 1:
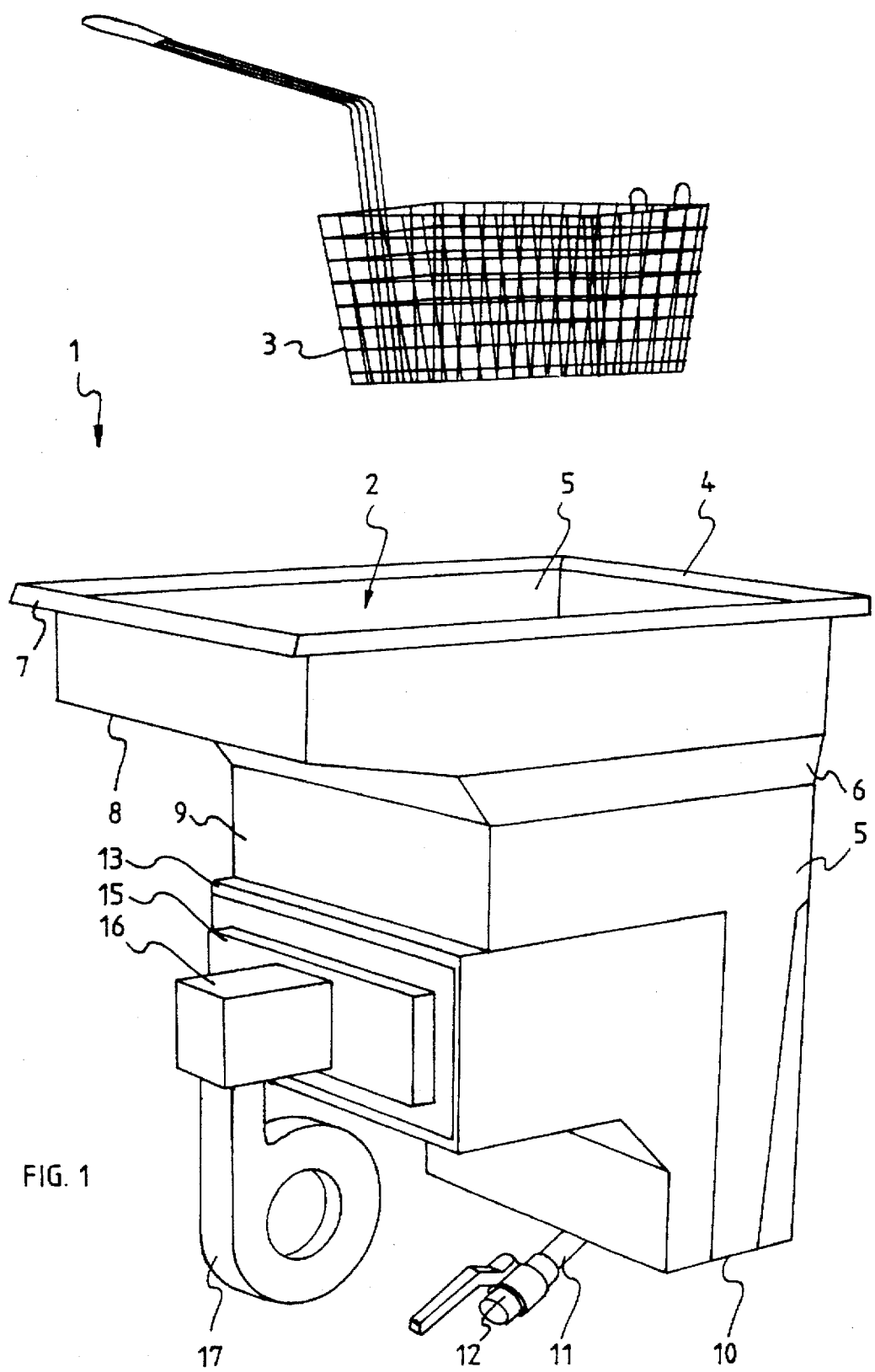
FIG. 1 shows a perspective view of a frying device according to the invention.

FIG. 1 shows a frying device 1 according to the invention. The frying device 1 comprises a rectangular frying tank 2, in which two baskets 3 with products for frying can be placed. The frying tank 2 is bounded by a vertical rear wall 4 and essentially vertical walls or side panels 5. The side panels 5 are provided with a slightly outward directed break 6, for reinforcement. The frying device 1 has a flanged edge 7 at the top side. The frying device 1 also comprises a forward projecting drip plate 8, consisting of a slightly sloping panel, while a front end 9 of the frying tank 2 is formed by a vertical panel. On a bottom plate 10 the frying device 1 is provided with a drain cock or drain pipe 11 with a shut-off valve 12, by means of which the frying tank 2 can be emptied. A vertical plate 13 is provided at the front side, which plate is provided with a rectangular opening 14 (see FIG. 2). A 100% premixed gas burner 15 is fixed by means of screws on said plate 13, in such a way that the gas burner 15 projects slightly through the opening 14 into the interior of the frying device 1. Packing material is disposed between the contact surface of the gas burner 15 and the plate 13, so that the frying device 1 is shut off well and a closed gas circuit is produced. The gas burner 15 comprises a mixing chamber 16, to which a fan 17 is connected, which fan supplies the air which is needed for the combustion. The minimum of excess air can be set by varying the speed of rotation of the fan 17.

Figure 2:
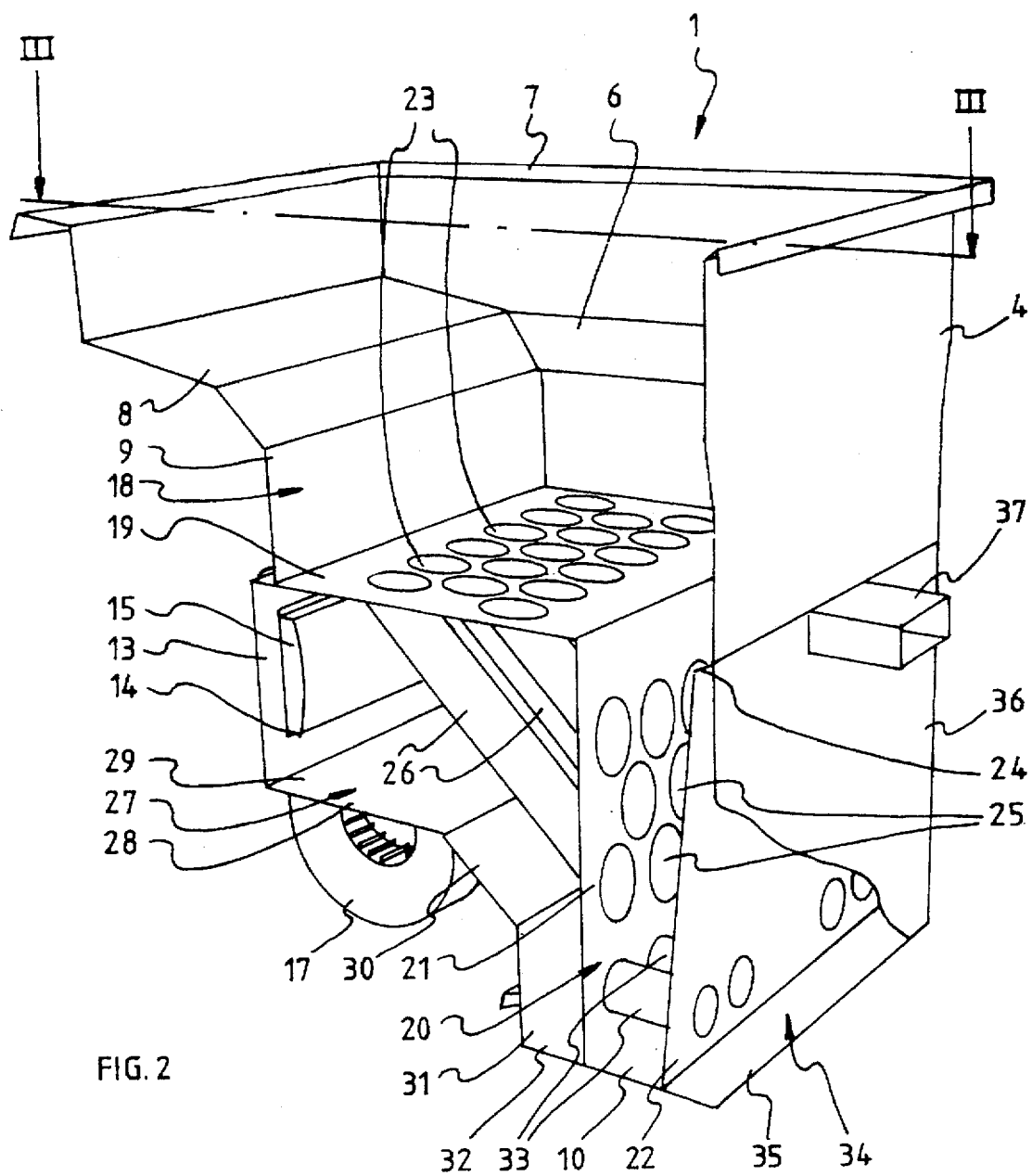
FIG. 2 shows another perspective view of the frying device of FIG. 1, in which one side is cut away.

FIG. 2 shows the same frying device 1, in which a side plate has been cut away. The frying tank 2 consists of an upper part 18, which is bounded by a bottom 19, the front end 9, the side panels 5 and the rear wall 4, and a lower part or shaft 20, which is bounded by a front wall 21, a rear wall 22, the bottom plate 10 and the side panels 5. The bottom 19 of the frying tank 2 is flat and rectangular in shape. In the front end 9 of the frying tank 2 a feed-through aperture for a probe for temperature measurement is placed directly above the bottom 19. Said probe is connected to a thermostat for regulating the heat supply to the frying medium. The feed-through aperture, probe and thermostat are not shown in the drawings. Seventeen holes 23 with elliptical circumference are provided in the bottom 19. These holes 23 are distributed over three rows, which extend over the full width of the bottom 19: from front to back a row of six holes, a row of five holes, and again a row of six holes. At the rear, the frying tank 2 passes into the narrow, downward extending, essentially vertical shaft 20. The shaft 20 gradually narrows a little towards the bottom, through the fact that the rear wall 22 of the shaft 20 is at a slight angle relative to the front wall 21 of the shaft 20. The rear wall 22 of the shaft 20 connects at the top by way of a break 24 to the rear wall 4 of the frying tank 2. The bottom of the shaft 20 is formed by the bottom plate 10, which is welded to the frying device 1 and is the shape of an inverted pyramid. Seventeen holes 25 with elliptical circumference are also provided in the front wall 21 of the shaft 20. These holes 25 are likewise arranged in three rows, namely a row of six holes, a row of five holes, and again a row of six holes. A hollow pipe 26 is welded between each of the holes 23 in the bottom 19 of the frying tank 2 and the corresponding hole 25 in the front wall 21 of the shaft 20. Each pipe 26 forms an angle of 45 degrees both with the bottom 19 of the frying tank 2 and with the front wall 21 of the shaft 20. A bunch of seventeen parallel hollow pipes 26 is thus produced. This bunch acts as a first heat exchanger. The pipes 26 are situated in a first heating chamber 27, which is bounded by the side panels 5, the front wall 21 of the shaft 20, the plate 13 with the gas burner 15, the bottom 19, a bottom panel 28, consisting of faces 29, 30 and 31, and a bottom 32. The face 29 runs horizontally and connects to the face 30, which runs parallel to the pipes 26 at some distance therefrom. The face 30 connects to the face 31, which runs vertically and is connected to the bottom 32. The bottom panel 28 is fixed by means of screw connections to the frying device 1. Packing material is placed between the contact surfaces of the bottom panel 28 and the frying device 1. The bottom 32 is formed by a horizontal flat plate, which is welded to the side panels 5 and the front wall 21 of the shaft 20. Four round, hollow pipes 33 are disposed adjacent to each other in the bottom of the shaft 20, at some distance above the bottom plate 10. The pipes 33 are welded to the front wall 21 and the rear wall 22 of the shaft 20. Openings at the level of the pipes 33 are also provided in the front wall 21 and the rear wall 22 of the shaft 20, so that the pipes 33 form a passage from the closed heating chamber 27 around the pipes 26 to a second heating chamber 34, which is bounded by the side panels 5, the rear wall 22, the break 24, a bottom 35 and the rear wall 4. Adjoining the heating chamber 34, the rear wall 4 consists of a plate 36 which is screwed to the frying device 1. The plate 36 is shown partially cut away in the figure. Packing material is placed between the contact surfaces of the plate 36 and the edges of the second heating chamber 34, so that a closed unit is produced. The closed heating chamber 34 acts as a second heat exchanger. In the centre of the top side of the plate 36, a rectangular outlet 37 is connected to the second heating chamber.

Figure 3:
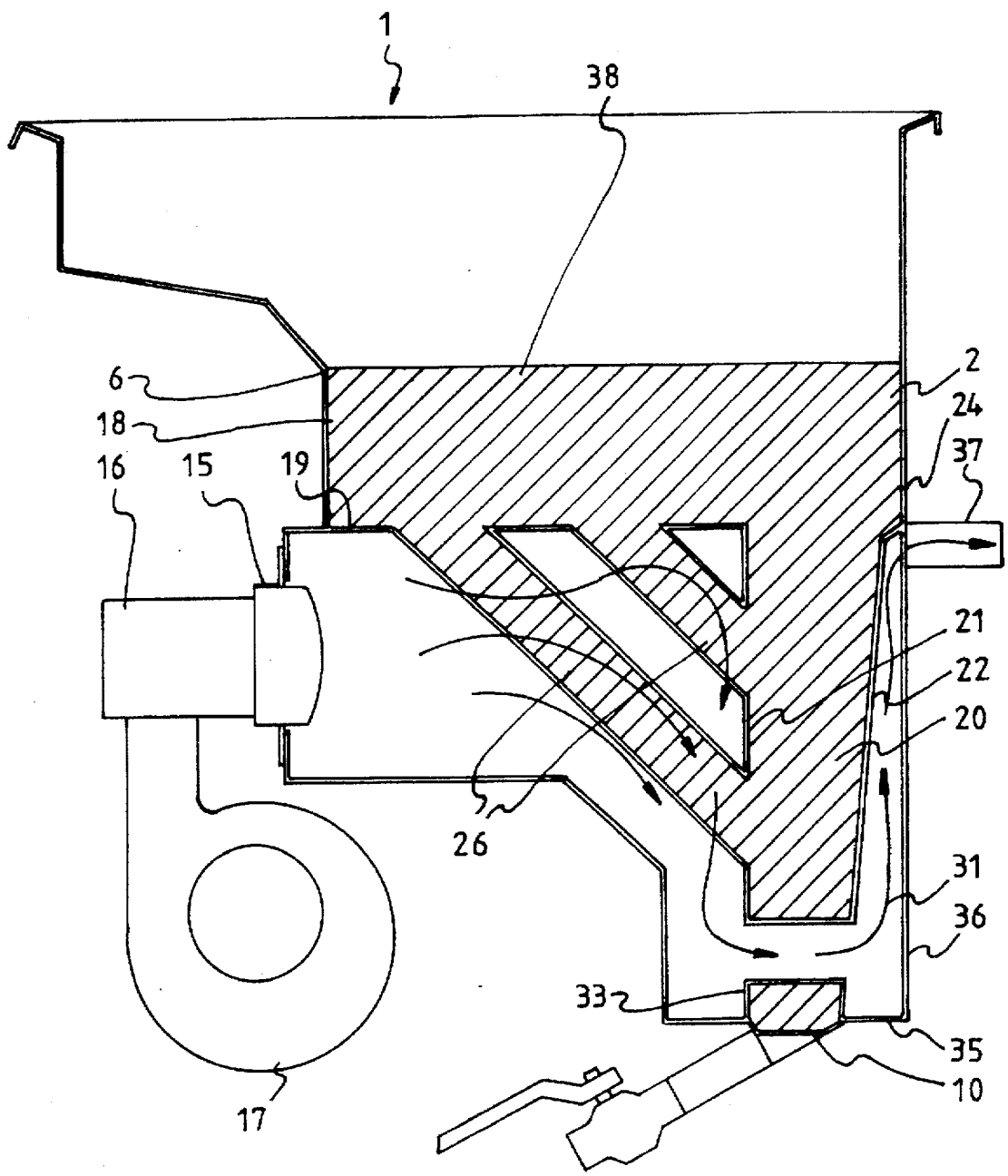
FIG. 3 shows in cross-section the frying device along the line III—III in FIG. 2, in which the direction of flow of combustion gases is indicated by arrows.

FIG. 3 shows by means of arrows how the heat flows through the frying device 1. When the frying device 1 is in operation, the frying tank 2 is filled with frying medium 38, such as deep-frying fat, approximately up to the break 6 in the side panels 5. The shaft 20 and the pipes 26 are thus also filled with frying medium 38. When the gas burner 15 is in operation, the fan 17 will blow a certain quantity of air into the mixing chamber 16, where the air is mixed with the correct quantity of gaseous fuel. The speed of rotation of the fan 17 is set in such a way that the excess air is minimal. The mixture of gaseous fuel and air flows out of the mixing chamber 16 to the gas burner 15 and ignites on the burner surface. The combustion gases flow along the pipes 26 and release their heat to the frying medium 38 in the frying tank 2 through the walls of the pipes 26, the bottom 19 of the upper part 18 of the frying tank 2 and the front wall 21 of the shaft 20. The combustion gases then flow through the pipes 33 into the second heating chamber 34. There, the combustion gases flow along the rear wall 22 of the shaft 20 and release residual heat to the frying medium 38 in the shaft 20 through said rear wall 22. The combustion gases leave the frying device 1 through the outlet pipe 37. Through the heating, the frying medium 38 in the pipes 26 will flow upwards in the frying tank 2 as a result of free convection. Frying medium 38 in the shaft 20 will flow into the pipes 26. The heating thus produces a circulating flow in the frying tank 2. This flow produces rapid and uniform heating of the frying medium 38. The circulating flow also entrains frying residues in the frying tank 2 to the drain pipe 11 at the bottom of the shaft 20.

Figure 4:
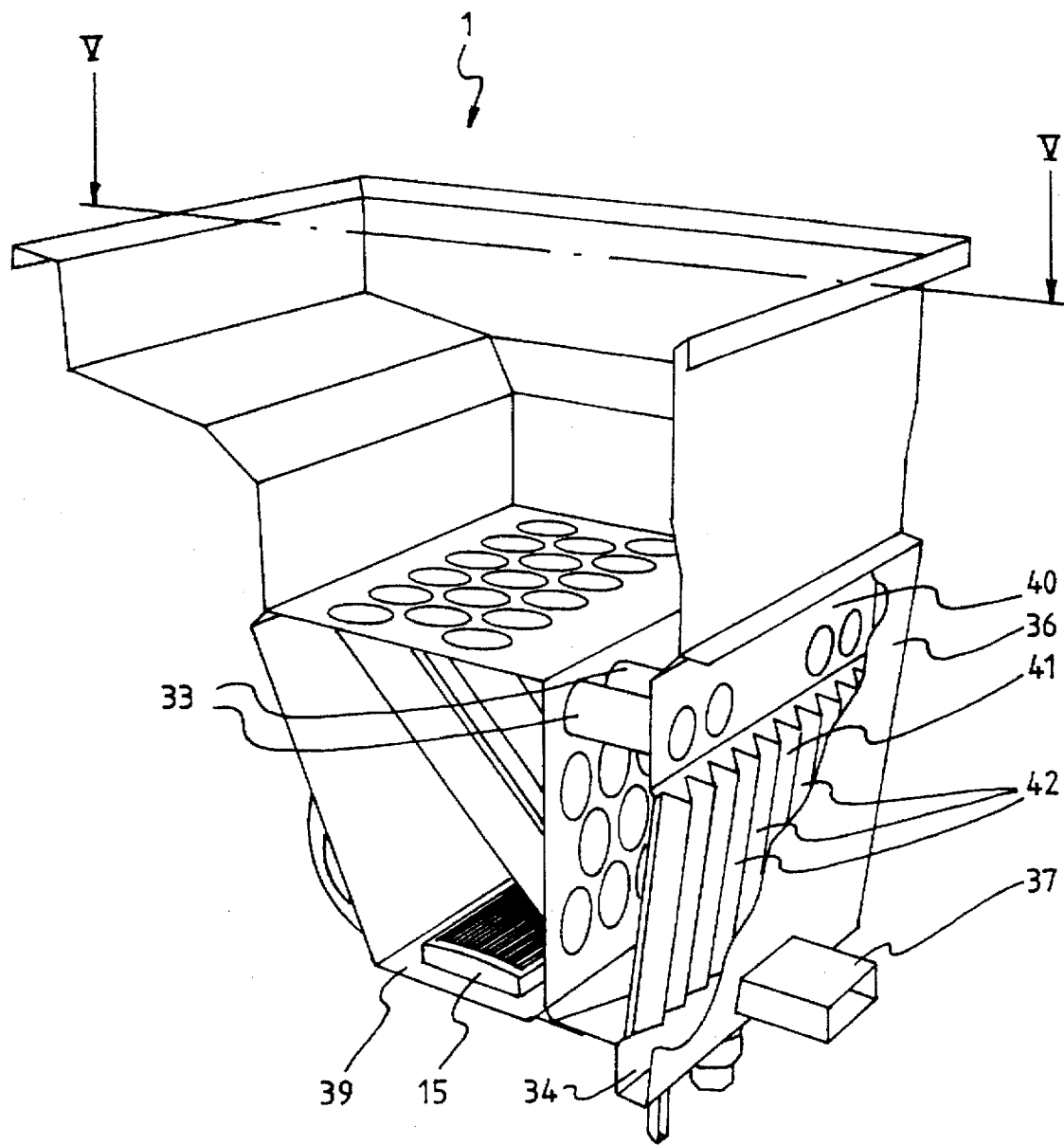
FIG. 4 shows a perspective view of another possible frying device according to the invention, in which one side is cut away.

FIG. 4 shows another possible embodiment of a frying device 1 according to the invention. The gas burner 15 in this case opens out in the bottom of the first heating chamber 27 and projects through a rectangular opening in the bottom 39. The pipes 33, which run from the front wall 21 of the shaft 20 to the rear wall 22 of the shaft 20, traverse the shaft 20 at the top side. The rear wall 22 of the shaft 20 consists of a flat upper part 40, in which the pipes 33 open out, and a corrugated or ribbed lower part 41. The ribbed lower part 41 is made up of V-shaped ribs 42, with the result that the surface of the plate 22 between the shaft 20 and the second heating chamber 34 is increased, so that more efficient heat exchange occurs. The outlet 37 is disposed on the bottom side of the plate 36.

Figure 5:
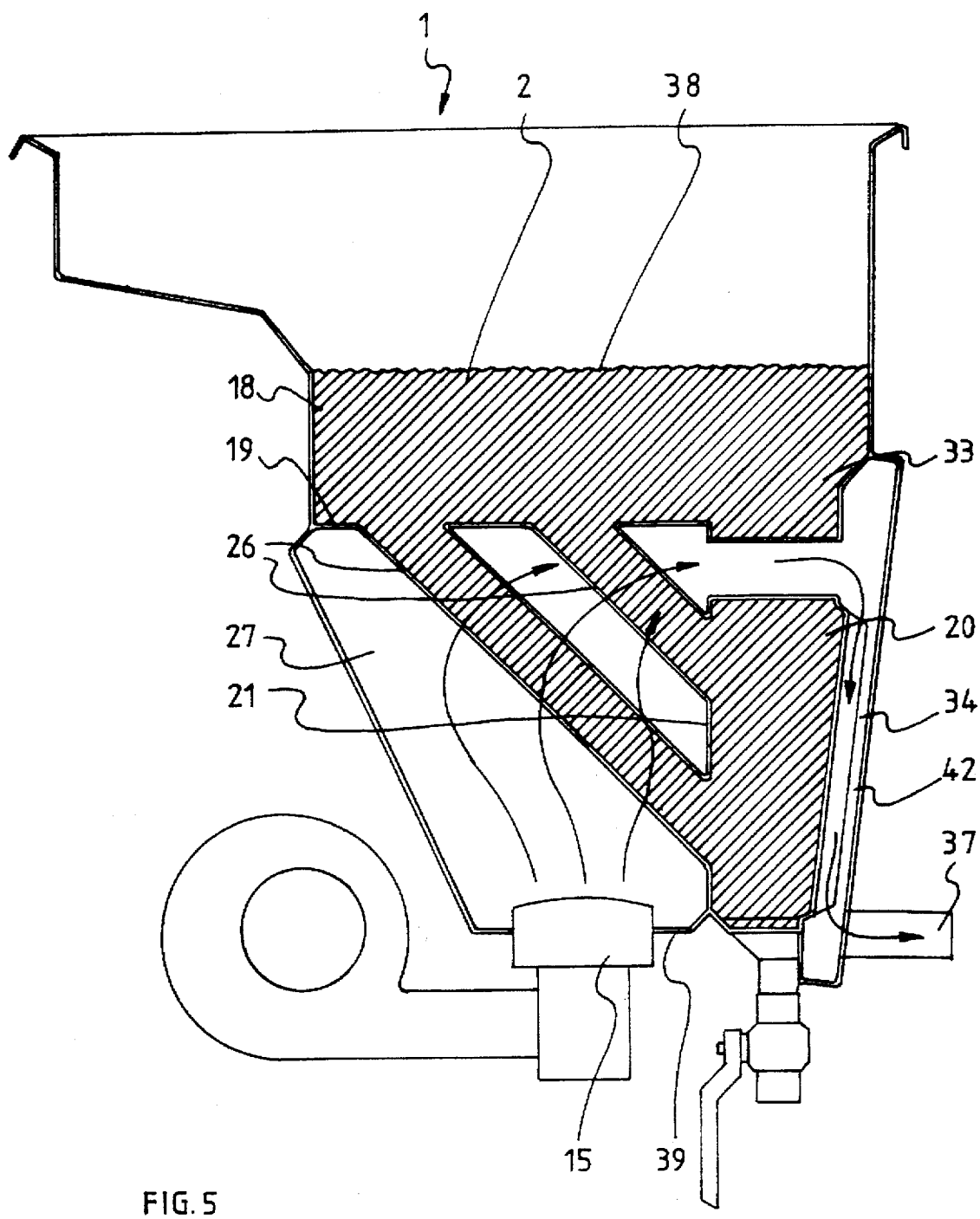
FIG. 5 shows a cross-section of a frying device along the line V—V in FIG. 4.

FIG. 5 shows the frying device of FIG. 4 in cross-section along the line V—V of FIG. 4. Arrows are used to indicate how the heat flows through the frying device 1. The shaft 20, the pipes 26 and the upper part 18 of the frying tank 2 are filled with frying medium 38. Combustion gases flow in the direction of the arrows through the first heating chamber 27 and along the pipes 26, and release their heat to the frying medium 38 in the frying tank 2 through the walls of the pipes 26, the bottom 19 of the upper part 18 of the frying tank 2 and the front wall 21 of the shaft 20. The combustion gases then flow through the pipes 33 into the second heating chamber 34. There, the combustion gases flow down the rear wall 22 with the V-shaped ribs 42 and release their residual heat through said rear wall 22 to the frying medium 38 in the shaft 20. The combustion gases leave the frying device 1 through the outlet 37 at the bottom side of the second heating chamber 34. In this embodiment of the frying device 1 also, the frying medium 38 in the pipes 26 will flow upwards into the upper part 18 of the frying tank 2, and the heating will cause a circulating flow to occur in the frying tank 2. In this embodiment the heat transfer between the heating chambers 27, 34 and the frying tank 2 is more efficient than in the case of the embodiment of FIGS. 1 to 3, through the fact that the combustion gases flow in a more advantageous manner through the two heating chambers 27, 34. Better heat transfer is also achieved, through the fact that the surface of the rear wall 22 of the shaft 20 is increased by the V-shaped ribs 42. The maximum waterboil efficiency in this embodiment lies at around 80%.

I claim:

1. Frying device, comprising a frying tank with a drain cock and heating means for heating the frying medium, which frying tank consists of an upper and a lower part, which upper part has side walls and an upper part bottom, and in which upper part bottom a bottom tank or shaft extends downwards and has side walls and a lower part bottom, and which frying tank can be filled with a frying medium such as fat or oil for deep-frying, and of which the side wall of the shaft is in open connection with the upper part of the frying tank by way of a number of pipes which pipes are placed at an angle to the horizontal, so that by means of the pipes the frying medium in the shaft is in open communication to the frying medium in the rest of the frying tank, and which drain cock is provided in the bottom of the frying tank, in order to be able of emptying the frying tank, characterized in that a side wall of the shaft or bottom tank contains a large number of openings and the bottom of the upper part contains the same number of openings and that by means of a tube each opening in the side wall of the shaft is interconnected to a opening in the bottom of the upper part and that the tubes are directly heated by the heating means.

2. Frying device according to claim 1, characterized in that the pipes are enclosed by a first heating chamber with an inlet and an outlet for heating gases, such that the heating medium will flow around the tubes or pipes.

3. Frying device according to claim 2, characterized in that the bottom of the upper part of the frying tank and the front wall of the shaft are part of the enclosure of the first heating chamber.

4. Frying device according to one of claims 2 or 3, characterized in that the outlet of the first heating chamber pass through the lower tank or shaft and is interconnected to an inlet of a second heating chamber of which one of the walls of this second heating chamber being the rear wall of the shaft.

5. Frying device according to claim 4, characterized in that the rear wall of the shaft is corrugated.

* * * * *